United States Patent [19]
Home

[11] Patent Number: 5,383,487
[45] Date of Patent: Jan. 24, 1995

[54] REFILL-PREVENTION VALVE

[76] Inventor: William Home, 9Fl.-3, No. 374, Sec. 2, Pa Teh Rd., Taipei, Taiwan, Prov. of China

[21] Appl. No.: 219,256

[22] Filed: Mar. 29, 1994

[51] Int. Cl.⁶ .................................................. B65D 47/02
[52] U.S. Cl. .................. 137/315; 137/533.31; 251/82; 222/147
[58] Field of Search ............... 137/315, 533.31; 251/82; 215/21, 22; 222/147

[56] References Cited

U.S. PATENT DOCUMENTS

| | | | |
|---|---|---|---|
| 3,704,813 | 12/1972 | Devol | 137/315 X |
| 4,543,980 | 10/1985 | van der Sanden | 222/147 X |
| 4,573,611 | 3/1986 | O'Connor | 222/147 |
| 4,813,575 | 3/1989 | O'Connor | 222/147 |
| 4,921,214 | 5/1990 | Jernberg | 222/147 X |
| 5,036,876 | 8/1991 | Jernberg | 251/82 X |
| 5,295,502 | 3/1994 | Lane | 222/147 X |
| 5,305,925 | 4/1994 | Vogel | 222/147 |

FOREIGN PATENT DOCUMENTS

| | | | |
|---|---|---|---|
| 238418 | 8/1925 | United Kingdom | 215/21 |
| 2133502 | 7/1984 | United Kingdom | 222/147 |

Primary Examiner—John Rivell
Attorney, Agent, or Firm—Leydig, Voit & Mayer

[57] ABSTRACT

A refill-prevention valve has a housing. The housing has a first tubular section defining a first passage, a second tubular section axially projecting from the first tubular section and defining a second passage being in fluid communication with the first passage, a third tubular section transversely projecting from the second tubular section and defining a third passage being in fluid communication with the second passage, and an annular flange which is formed on an internal surface of the housing between the first and second tubular sections and which defines an aperture. An annular plug is received in the aperture defined in the annular flange. A sleeve defines an aperture, an open end being disposed on the annular plug, a closed end and a disk formed on the closed end. A plunger is slidably received in the second passage for pushing the sleeve into the aperture defined in the annular flange and for pushing the annular plug out of the aperture defined in the annular flange.

5 Claims, 3 Drawing Sheets

REFILL-PREVENTION VALVE

BACKGROUND OF INVENTION

The present invention relates to a refill-prevention valve for a coolant vessel.

In the U.S.A., under governmental requirements, manufacturers are restrained from refilling vessels with coolant. Such requirements are focused on safety as such vessels employ thin walls which might be deformed as the pressure within such vessels changes when such vessels are refilled with coolant. However, there have not been any valves which prevent refilling vessels with coolant.

SUMMARY OF INVENTION

Therefore, it is the primary object of the present invention to provide a refill-prevention valve for a vessel.

The primary object of the present invention is achieved by providing a refill-prevention valve which has a housing. The housing has a first tubular section defining a first passage, a second tubular section axially projecting from the first tubular section and defining a second passage being in fluid communication with the first passage, a third tubular section transversely projecting from the second tubular section and defining a third passage being in fluid communication with the second passage, and an annular flange which is formed on an internal surface of the housing between the first and second tubular sections and which defines an aperture. An annular plug is received in the aperture defined in the annular flange. A sleeve defines an aperture, an open end being disposed on the annular plug, a closed end and a disk formed on the closed end. A plunger is slidably received in the second passage for pushing the sleeve into the aperture defined in the annular flange and for pushing the annular plug out of the aperture defined in the annular flange.

For a better understanding of the present invention and objects thereof, a study of the detailed description of the embodiments described hereinafter should be made in relation to the accompanying drawings.

DETAILED DESCRIPTION OF PREFERRED EMBODIMENT

Figure 1:
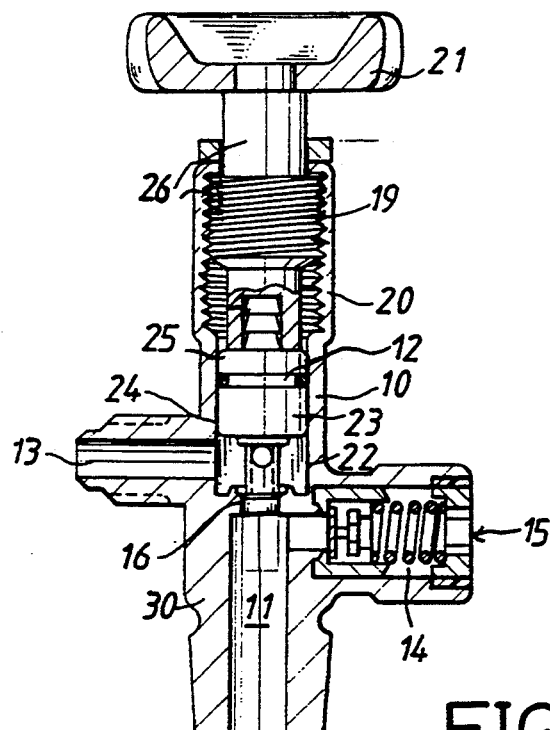
FIG. 1 is a cross-sectional view a refill-prevention valve of in accordance with the preferred embodiment of the present invention.

Referring to FIG. 1, in accordance with the preferred embodiment of the present invention, a refill-prevention valve has a housing 10 which has a first tubular section (not numbered), a second tubular section (not numbered) axially projecting from the first tubular section, a third tubular section (not numbered) transversely projecting from the second tubular section and a fourth tubular section (not numbered) transversely projecting from the first tubular section. The first tubular section of the housing 10 defines a first passage 11. The second tubular section of the housing 10 defines a second passage 12. The third tubular section of the housing 10 defines a third passage 13. The fourth tubular section of the housing 10 defines a fourth passage 14.

The first tubular section of the housing 10 is secured in an aperture defined in a vessel (not shown) so that the housing 10 is in fluid communication with the vessel. To fill the vessel with coolant, coolant is pumped, under high pressure, through the third passage 13 and the first passage 11 into the vessel. A safety device 15 is received in the fourth passage 14. Coolant will be released from the vessel through the safety device 15 to the exterior of the vessel if the pressure in the vessel reaches a predetermined value. The safety device 15 will not be further described as it is well known, and is not the spirit of the present invention.

Figure 2:
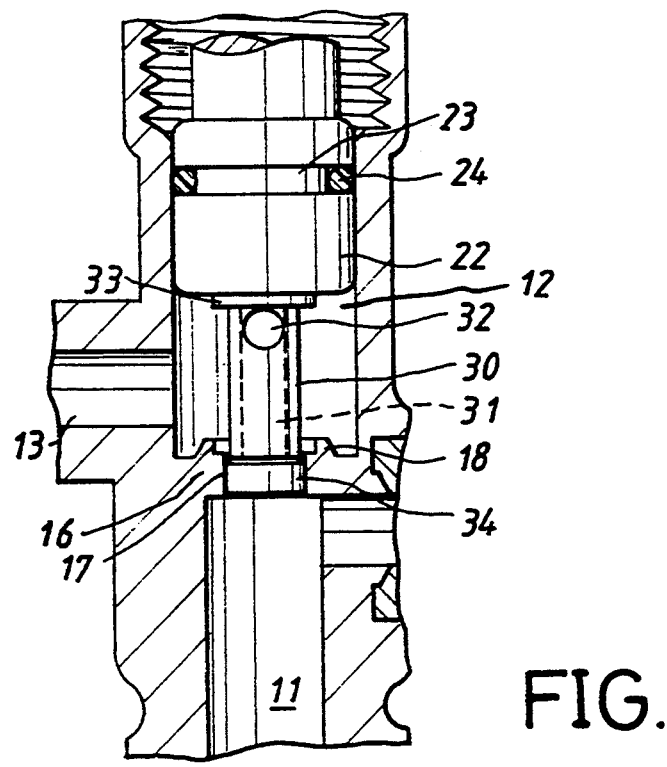
FIG. 2 is an enlarged cross-sectional partial view of the refill-prevention valve in FIG. 1, showing a plunger in a first position, and showing an annular plug which keeps a sleeve in a first position so as to allow coolant to flow through the refill-prevention valve.

Referring to FIG. 2, the present invention will be described in detail. An annular flange 16, which defines an aperture 17, is formed on an internal surface of the housing 10 between the first and second tubular sections of the housing 10. An annular ridge 18 projects from the annular flange 16 towards the second tubular section of the housing 10. An annular plug 34, which is a plastic element, is received in the aperture 17. The diameter of the annular plug 34 is marginally greater than the diameter of the aperture 17 so that the former is retained in the latter.

A sleeve 30 is disposed on the annular plug 34. The sleeve 30 defines an axial passage 31, an aperture 32, a closed end on which a disk 33 is formed and an open end which faces the annular plug 34.

A plunger 22 defines an annular groove 23 in order to receive an annular seal 24, a first end and a second end from which a chevron-shaped protrusion 25 axially projects. The plunger 22 is received in the second passage 12 so that the annular seal 24 seals the second passage 12. A spigot 26 (see FIG. 1) has a first end which defines a recess (not numbered) and a second end which is linked to a knob 21. The chevron-shaped protrusion 25 is secured in the recess which is defined in the first end of the spigot 26. A thread 20 is formed on a middle section of the spigot 26. A thread 19 is formed on an upper section of an internal surface of the second tubular section of the housing 10. The thread 20 engages with the thread 19 so that the plunger 22 is moved in a rectilinear path in the second passage when the knob 21 is rotated.

In assembly of the refill-prevention valve, the annular plug 34 is received in the aperture 17. The sleeve 30 is mounted on the annular plug 34 so that the aperture 32 is in fluid communication with the second passage 12. By engaging the thread 20 with the thread 19, the spigot 26 is received in the second passage 12. The plunger 22 is in a position so that the first end thereof does not contact the disk 33 of the sleeve 30.

To fill the vessel with high-pressure coolant, coolant is pumped, under high pressure, through the third passage 13 into the second passage 12. High-pressure coolant will not press the sleeve 30 into the aperture 17 as it is supported by means of the annular plug 34 which is retained in the aperture 17. Thus, high-pressure coolant is allowed to further flow through the aperture 32, the passage 31, an aperture which is defined in the annular plug 34 and the first passage 11 into the vessel (not shown).

Figure 3:
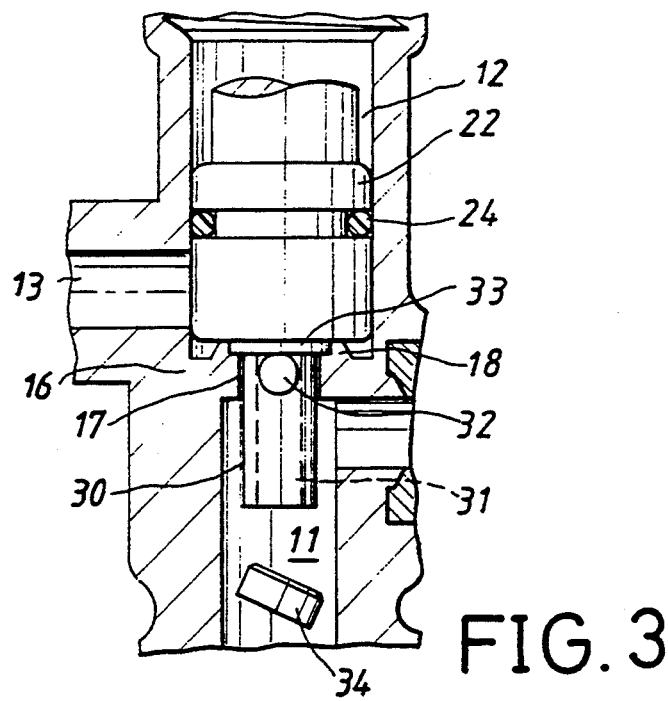
FIG. 3 is a similar view to FIG. 2, but showing the plunger pushing the sleeve to a second position so as to keep coolant from flowing through the refill-prevention valve, and showing the sleeve pushing the annular plug out of the valve.

Referring to FIG. 3, the refill-prevention valve is blocked after the vessel is filled with high-pressure coolant. As the thread 20 engages with the thread 19, by rotating the knob 21, the plunger 22 is moved downwards so as to push the sleeve 30 into the aperture 17 so that the aperture 32 is blocked by means of the annular flange 16. Furthermore, the third passage 13 is blocked by means of the plunger 22. Thus, refill-prevention valve is blocked.

The disk 33 engages with the annular flange 16 so that the sleeve 30 will not be pushed by means of the plunger 22 into the first passage 11. However, the disk 33 is a plastic element so that it might be deformed and forced through the aperture 17 when it is fiercely pressed by means of the plunger 22. The annular ridge 18 keeps the plunger 22 from further pressing the sleeve 30 into the first passage 11.

As the sleeve 30 is pushed by means of the plunger 22 into the aperture 17, the annular plug 34 is pushed by means of the sleeve 30 out of the aperture 17. Thus, the sleeve 30 cannot be supported by means of the annular plug 34.

Figure 4:
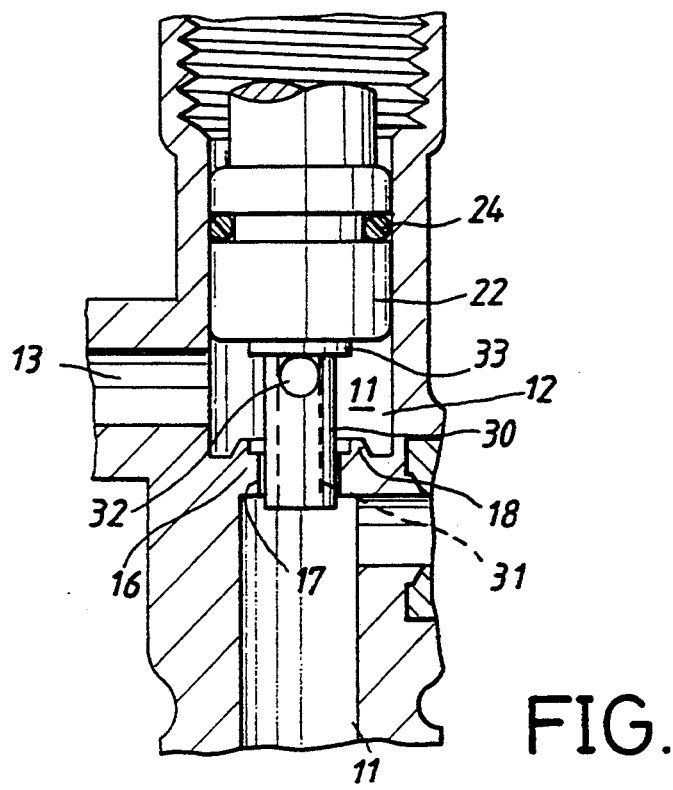
FIG. 4 is a similar view to FIG. 2, but showing the plunger moved to the first position, and showing the sleeve moved to the first position so as to allow coolant to flow through the refill-prevention valve.

Referring to FIG. 4, to release coolant from the vessel (not shown), by rotating the knob 21 (see FIG. 1), the plunger 22 is moved upwards. The high-pressure coolant within the vessel (not shown) pushes sleeve 30 upwards so that the aperture 32 is in fluid communication with the second passage 12. Thus, coolant flows through the first passage 11, the passage 31, the aperture 32, the second passage 12 and the third passage 13 out of the vessel (not shown).

Figure 5:
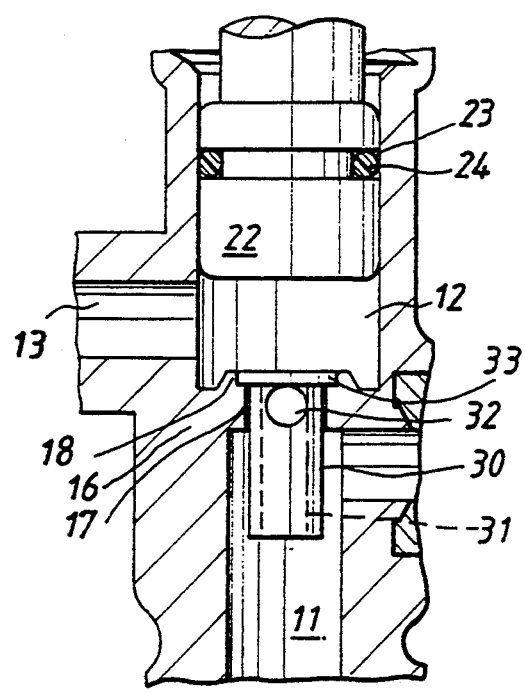
FIG. 5 is a similar view to FIG. 2, but showing the plunger in the first position, and showing the sleeve in the second position so as to keep coolant from flowing through the refill-prevention valve.

Referring to FIG. 5, the sleeve 30 enters the aperture 17 because of gravity when the pressure within the vessel (not shown) decreases to a certain value after coolant vents out of the vessel. If there is an attempt to pump high-pressure coolant through the refill-prevention valve into the vessel, high-pressure coolant will flow through the third passage 13 into the second passage 12. High-pressure coolant will push the sleeve 30 into the aperture 17 so that the aperture 32 is sealed by the annular flange 16, thus stopping the attempt to refill the vessel with coolant.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

What is claimed is:

1. A refill-prevention valve comprising:
    a housing comprising a first tubular section defining a first passage, a second tubular section axially projecting from the first tubular section and defining a second passage being in fluid communication with the first passage, a third tubular section transversely projecting from the second tubular section and defining a third passage being in fluid communication with the second passage, and an annular flange which is formed on an internal surface of the housing between the first and second tubular sections and which defines an aperture;
    an annular plug being received in the aperture defined in the annular flange;
    a sleeve defining an aperture, an open end being disposed on the annular plug, a closed end and a disk formed on the closed end; and
    a plunger being slidably received in the second passage for pushing the sleeve into the aperture defined in the annular flange and for pushing the annular plug out of the aperture defined in the annular flange.

2. A refill-prevention valve in accordance with claim 1 wherein the second tubular section of the housing comprises a thread formed on an internal surface thereof, and wherein the plunger is linked to a spigot comprising a thread formed thereon, whereby the thread of the spigot is engageable with the thread of the second tubular section of the housing.

3. A refill-prevention valve in accordance with claim 1 wherein the spigot is linked to a knob which is disposed in the exterior of the second tubular section of the housing.

4. A refill-prevention valve in accordance with claim 1 comprising an annular ridge formed on the annular flange.

5. A refill-prevention valve in accordance with claim 1 wherein the plunger defines an annular groove for receiving an annular seal.

* * * * *